United States Patent [19]
Drummond

[11] Patent Number: 5,906,676
[45] Date of Patent: May 25, 1999

[54] EJECTOR-AUGMENTED OVERSPRAY RECLAIM SYSTEM

[75] Inventor: Colin K. Drummond, Lakewood, Ohio

[73] Assignee: Nordson Corporation, Westlake, Ohio

[21] Appl. No.: 08/942,213

[22] Filed: Oct. 1, 1997

[51] Int. Cl.$^6$ .............................. B01D 46/00; B05C 15/00
[52] U.S. Cl. ............................... 95/273; 118/326; 55/431; 55/337; 454/53
[58] Field of Search .............................. 55/DIG. 46, 210, 55/459.4, 431, 337; 118/308, 312, 324, 326; 454/50, 53; 95/273, 287; 427/478, 482; 196/496, 498

[56] References Cited

U.S. PATENT DOCUMENTS

| | | | |
|---|---|---|---|
| 4,197,936 | 4/1980 | Fowler | 198/498 |
| 4,504,292 | 3/1985 | Vohringer | 55/DIG. 46 |
| 5,238,496 | 8/1993 | Koponen | 118/324 |
| 5,505,763 | 4/1996 | Reighard et al. | 55/DIG. 46 |
| 5,743,958 | 4/1998 | Shutic | 55/DIG. 46 |

*Primary Examiner*—David A. Simmons
*Assistant Examiner*—Calvin Padgett
*Attorney, Agent, or Firm*—Calfee, Halter & Griswold LLP

[57] ABSTRACT

An apparatus and method of reclaiming particles of powder material from a powder spray system (100) having an inlet passageway (190) of a collection subsystem (104) in fluid communication with an interior of a spray booth (108). An airflow conduit (250) extends between a trough (140) located under a conveyor belt (130) which in turn is located below the spray booth (108) and the inlet passageway (190) of the collection subsystem (104). Airflow through the airflow conduit (250) is augmented by a compressed air injector (280) disposed in the airflow conduit (250) and oriented so that it ejects compressed air in the direction of the inlet passageway (190). In this manner, particulate matter (overspray) settling in the trough (140) becomes entrained in an airstream (252) flowing into the collection subsystem (104). The collection subsystem (104) suitably includes a cyclone separator (170) and a filter stack (200).

24 Claims, 1 Drawing Sheet

5,906,676

EJECTOR-AUGMENTED OVERSPRAY RECLAIM SYSTEM

FIELD OF THE INVENTION

The invention relates to powder spray systems and, more particularly, to the collection (reclaiming and re-use) of oversprayed powder from a powder coating booth.

BACKGROUND OF THE INVENTION

Powder spray systems are well known. Representative systems are disclosed, for example, in U.S. Pat. Nos. 4,910,047, 4,723,505 and 5,261,934, and in International Pat. App. No. PCT/GB94/00253 (published as WO95/10365), all of which are assigned to Nordson corp. of Westlake, Ohio 44145, who is the assignee of the present invention.

As disclosed in the aforementioned patents, the practice of powder coating involves spraying (with a spray gun) a dry powdered coating material onto a substrate (workpiece), and thereafter heating the substrate and the powder so that the powder melts. Upon cooling, the melted powder forms a solid, continuous coating on the substrate. Often, an electrostatic charge is applied to the sprayed powder, and the substrate is electrically grounded, to increase to increase adhesion of the powder to the surface of the substrate.

Prior art powder spraying (deposition) is typically performed in a containment system such as in a spray booth or under a canopy so that any oversprayed powder ("overspray") can be collected (reclaimed), processed if necessary, and re-used.

Overspray is powder coating material which either misses the substrate being coated (i.e., it is not deposited onto the surface of the substrate), or which rebounds from, or which is deflected by the substrate, and ends up on other surfaces, particularly grounded surfaces, of the spray booth, such as walls of the spray booth and components of the conveyor system which supports the substrate being coated in the spray booth. Typically, parts (substrates) being coated are suspended from the conveyor or carried on the conveyor through the spray booth.

The containment and collection (reclaiming) of overspray particles is important since the powder material is often very expensive. Reclaiming oversprayed powder in a spray booth is typically implemented by an exhaust system which creates a negative pressure within the spray booth and draws the powder entrained in a stream of air out of the spray booth into a powder recovery unit or module (powder collector). In the powder collector, particles of powder are separated from the air in which they are entrained by a one or more filters, collected in a hopper, after which the powder particles may be disposed of or sieved and re-supplied to the spray gun.

The prior art discloses the use of cyclone separators either instead of, or in conjunction with, filter cartridges. Such cyclone separators are effective in removing a majority of the oversprayed powder from the spray booth exhaust air and are generally easier to clean than filters because very little powder is deposited inside the cyclone housing. Cyclone separator are typically of either the tangential-feed of vertical-feed types. Both types operate on the principle of imparting a circumferential velocity to air-entrained overspray powder particles so that the powder particles are separated from the air by the combined effects of centrifugal and gravitational forces and fall to the bottom of the separator, there to be collected and removed (or treated and recycled or reclaimed). The remaining air, substantially stripped of overspray powder particles, is exhausted to the atmosphere or passed through a module containing a number of filter cartridges to remove any residual fine powder particles remaining entrained in the exhaust air.

Relevant concerns in powder spray systems include ensuring complete and efficient removal of overspray from the spray booth and components thereof, as well as ease of maintenance. For example, in large-scale manufacturing operations, it is not enough to simply contain and collect overspray. Due to the cost of the powder materials involved, it is also highly desirable to reclaim the overspray for re-use in the powder coating system.

The present invention advantageously employs several components of prior art powder spray systems, as described hereinabove, which are well known in the art and which require little, if any, further elaboration other than how they are integrated into the powder spray system of the present invention.

OBJECTS AND SUMMARY OF THE INVENTION

It is an object of the present invention to provide an apparatus and method of reclaiming overspray particles in a powder coating system which obviate the problems and limitations of the prior art systems.

It is yet another object of the present invention to provide an overspray collection subsystem incorporating a brush for dislodging the oversprayed particles from the conveyor moving the workpiece being sprayed through a spray booth and an air injector for creating a subambient airflow to entrain the oversprayed particles in an airstream flowing through a passageway into the collection subsystem.

It is another object of the present invention to provide an overspray collection subsystem that is both economical and efficient, that has few moving parts, and that is readily controlled for a variety of operating conditions.

In accordance with the invention, a powder spray system for powder coating a substrate in a spray booth includes a spray subsystem, an overspray collection subsystem, and a conveyor subsystem. The conveyor subsystem includes a conveyor belt located below the spray booth. The collection subsystem includes a trough located under the conveyor belt, and an inlet passageway in fluid communication with an interior of the spray booth. The collection subsystem creates subambient airflow in the inlet passageway. A rotating brush dislodges overspray particles from the conveyor belt, into the trough. An airflow conduit extends between the trough and the inlet passageway of the collection subsystem. Airflow through the airflow conduit is created by a rotating fanwheel in the collection subsystem and is augmented by a compressed air injector that is disposed and oriented in the airflow conduit so that it ejects compressed air in the direction of the inlet passageway. In this manner, particulate matter (overspray) settling in the trough becomes entrained in an airstream flowing into the collection subsystem. The collection subsystem suitably includes a cyclone separator and a filter stack.

In further accordance with the invention, the subambient airflow is controlled to establish a desired pressure draw by the airflow conduit from the trough, and the precise positioning of the compressed air injector and the air pressure and flow being delivered thereby is also readily adjusted.

In further accordance with the invention, the subambient airflow is provided by a fanwheel and by a cyclone separator.

In further accordance with the invention, a rotating brush dislodges overspray particles form the conveyor belt into the trough, and pressure of the brush against the belt is readily adjusted.

In further accordance with the invention, an airtight seal between the trough and the bottom surface of the belt is not necessary. However, seals may be provided to control (meter) the influx of "makeup" air into the overspray collection subsystem.

In further accordance with the invention, a controller controls the speed of a motor driving the fanwheel, as well as the air pressure being supplied to the compressed air injector, so that the suction generated in the overspray collection subsystem remains constant.

In this manner, there is provided apparatus and methods for reclaiming overspray in a powder coating system that is both efficient and economical, and that in addition to being useable in the presently preferred embodiment described, is also readily adapted to a variety of applications including those with overhead conveyors instead of conveyor belts, and those with cyclone and/or filter cartridge collection systems.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
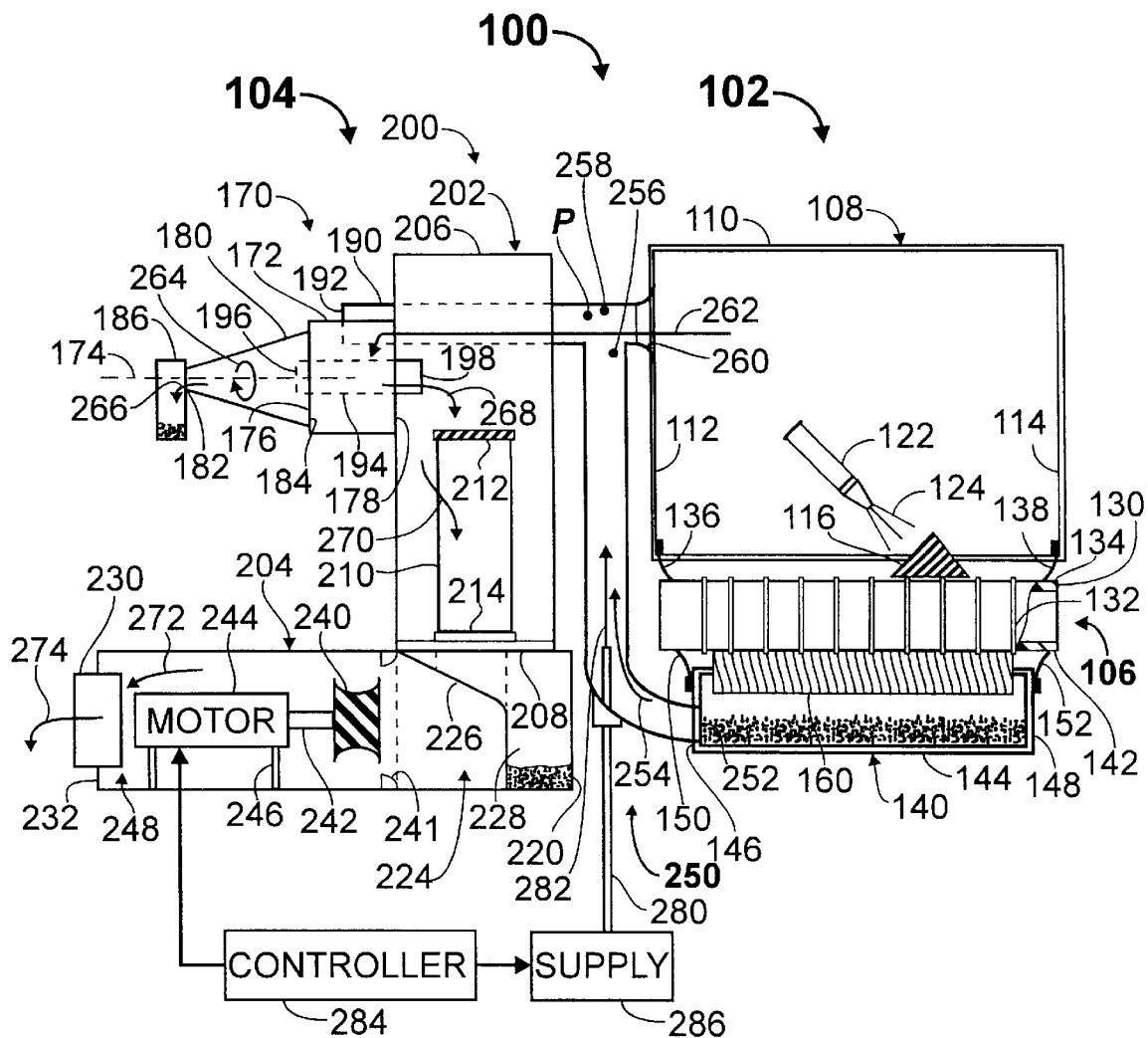
FIG. 1 is a schematic of the powder spray system of the present invention, illustrating the components thereof and their operation.

FIG. 1 shows the powder spray system 100 of the present invention which includes the following major components: a spray subsystem 102, an overspray collection subsystem 104, and a conveyor subsystem 106.

The spray subsystem 102 includes an enclosure 108, otherwise referred to as a "booth" or a "canopy". The booth 108 has a top wall 110 and, in the case of a rectangular booth, four sidewalls. Two opposite (left and right) sidewalls 112 and 114 are shown in the figure. Other two (front and back) sidewalls of the enclosure are not visible in this figure. The bottom of the booth 108 is open. In other words, the booth 108 is formed as a five-sided box.

A to-be-coated part (substrate) 116 is supported at the bottom of the booth 106 by a conveyor belt 130 which is described in greater detail hereinbelow, the top surface of which is closely adjacent the bottom edges of the sidewalls (112, 114) of the booth. In this manner, the substrate 116 extends from just below the bottom edges of the sidewalls of the booth into the interior of the booth.

A spray gun 122 directs a stream 124 of powdered coating material onto a to-be-coated surface of the substrate 116. The spray gun 122 is any suitable spray gun, such as has been disclosed in one or more of the aforementioned patents.

As is known, some of the powdered coating material 124 directed at the substrate 116 by the spray gun 122 may not strike the substrate 116, some of the powdered coating material 124 may be deflected by the substrate 116, and some of the powdered coating material 124 may rebound off of the surface of the substrate 116, all of which powdered coating material which does not deposit onto the surface of the substrate 116 is referred to as "overspray", or "oversprayed powder". As described hereinbelow, the oversprayed powder is caused to become entrained in air, from whence it is subsequently separated and reclaimed.

The conveyor subsystem 106 includes a conveyor belt 130 which is suitably formed of a flexible material such as nitrile. Although such materials perform well in conveyor applications, they are often difficult to clean. This is relevant to the present invention in the context of removing overspray from the belt 130, the solution to which forms a key feature of the present invention.

A plurality of conductive or semiconductive strips 132 are embedded into the belt 130, are spaced apart from one another across the width of the belt 130, and are oriented to run along the length of the belt 130. These conductive strips 132 may be formed of a ductile metal, such as soft copper. Preferably, the strips 132 are semiconductive and are formed of an electrically conducting material which is preferably a carbon containing material, and more particularly a carbon fiber. Other electrically conducting materials such as carbon black or particulate graphite can be used for the conductive strips 132. The strips 132 are grounded, so that the substrate 116 can also be at ground potential. In this manner, electrostatically-charged powder directed by the spray gun 122 at the substrate 116 can be attracted thereto.

In use, the substrate 116 is disposed on the conveyor belt 130 which extends beyond (is longer than) the spray booth 108. The front and back sidewalls of the spray booth 108 have hinged or sliding doors (not shown) or are formed of a suitable flexible material to permit a substrate 116 resting on the belt 130 to be conveyed from without the spray booth 108 to within the spray booth 108, to be coated. In other words, the conveyor belt 130 runs in and out of the page, as shown in FIG. 1.

It is important that overspray particles remain contained in the system 100. To ensure that the overspray particles do not exit the system in the area of a small gap between the bottom edges of the sidewalls of the booth 108 and the top surface 134 of the conveyor belt 130 upon which the substrate 116 is supported and which consequently receives a bulk of (if not all of) any overspray attendant the substrate-coating operation, a seal 136 is disposed along the entire edge of the sidewall 112, and a seal 138 is disposed along the entire edge of the sidewall 114. The seals 136 and 138 are suitably formed of a resilient elastomeric material such as neoprene.

A collection trough 140 is disposed immediately below the bottom surface 142 of the conveyor belt 130. The trough 140 is approximately as wide as the belt 130 and, in a manner similar to that of the booth 108, is formed as a five-sided box having a bottom wall 144 (compare 110) and four sidewalls extending upward from the periphery of the bottom wall 144. Two opposite sidewalls 146 and 148 (compare 112 and 114) are shown in the figure. The top edges of the sidewalls of the trough 140 are advertently in close proximity to the bottom surface 142 of the belt 130. Nevertheless, there may be a gap therebetween. In the process of causing an airflow to entrain and move overspray particles to one or more collection areas, seals 150 and 152 (compare 136 and 138) are optionally (but, not necessarily) disposed on the top edges of the trough sidewalls to seal the small gap between the top edges of the trough sidewalls and the bottom surface of the conveyor belt. However, it is not necessary, nor is it necessarily preferred, to completely seal off the gap between the trough 140 and the conveyor belt 130, any gap therebetween permitting "makeup" air to enter the powder collection subsystem 104.

Generally, the trough 140 is wide open. Conventional thinking would dictate that it would be difficult to obtain sub-ambient pressure conditions with such a wide open configuration, without the use of a separate vacuum system communicating with the trough. The results obtained by using the airflow conduit and compressed air augmentation techniques of the present invention are therefore somewhat surprising.

A rotating, cylindrical brush 160 is disposed so as to extend from just outside the top of the trough 140 to within the interior of the trough 140. The brush is driven (rotated) by any suitable instrumentality such as an electric motor. The brush 160 has bristles which are formed of natural or synthetic fibers, and its diameter is such that the ends of the bristles engage the bottom surface 142 of the belt 130. The pressure with which the bristles engage the bottom surface 142 of the belt 130 can be adjusted by adjusting the distance between the brush 160 and the belt 130. In this manner, when the brush 160 is rotating, the bristles dislodge overspray particles from the bottom surface 142 of the belt 130 so that these particles will be collected in the trough 140, due to the combined effect of gravitational forces (as is evident) and diminished (below ambient) air pressure, the provision of which is described in greater detail hereinbelow. FIG. 1 shows particles having been collected in the trough 140 as a plurality of black dots.

For purposes of this description, the trough 140, the seals 134, 136, 150 and 152 and the brush 160 are components of the overspray collection subsystem 104, which is now described.

The overspray collection subsystem 104 includes a cyclone separator module 170 which, other than for form and fit, may be selected from a variety of prior art cyclone separator modules, such as those described hereinabove with respect to the aforementioned patents.

The cyclone separator module 170 includes an annular (cylindrical) plenum 172 disposed about an axis 174, having a diameter, having two opposite ends 176 and 178, and having a height as measured between the two opposite ends 176 and 178 along the axis 174.

A conical (funnel-like) chamber 180 is disposed at the one, open end 176 of the plenum 172, and is coaxial therewith. The conical chamber 180 has two ends 182 and 184. The end 184 has a larger diameter than the end 182. For example, the diameter of the end 184 is 4–10 times greater than the diameter of the end 182. Also, the height (as measured from end-to-end) of the conical chamber 180 is approximately equal to or slightly greater than the diameter of the end 184. The diameter of the end 184 is approximately equal to, and preferably no greater than, the diameter of the end 176 of the plenum 172. The height of the conical chamber 180 is approximately twice the height of the plenum 172.

A collection hopper 186, which may simply be a box having an opening to the atmosphere, is disposed at the small end 182 of the conical chamber 180. In use, overspray particles which are centrifugally separated from the airstream in which they are entrained, will exit the small end 182 of the conical chamber 180 to be collected in the collection hopper 186. The collection hopper 186 is in fluid communication with the conical chamber 180.

An elongate cylindrical inlet passageway (pipe) 190 is disposed parallel to the axis 174 and is in fluid communication with the interior of the spray booth 108. A one end 192 of the inlet passageway intersects the cylindrical sidewall of the plenum 172 at approximately halfway along the length of the sidewall, and is open to the interior of the plenum 172. In use, overspray particles entrained in an airflow will enter the plenum 172 via the inlet passageway 190. The inlet passageway 190 has a diameter which is a fraction, such as approximately one-quarter the diameter of the plenum 172. The inlet passageway 192 is in fluid communication with the plenum 172.

An elongate cylindrical outlet passageway (pipe) 194 is coaxial with the plenum 172, is disposed within the plenum 172, and has a length (from end-to-end) as measured along the axis 174 which is greater than the height of plenum 172. A one end 196 of the outlet passageway 194 extends beyond the end 176 of the plenum 172, partially into the conical chamber 180. For example, the outlet passageway 194 extends beyond the end 176 of the plenum 172, into the conical chamber 180, a distance of from one-eighth to one-tenth the height of the plenum 172. An opposite end 198 of the outlet passageway 194 extends beyond the end 178 of the plenum 172. For example, the outlet passageway 194 extends beyond the end 178 of the plenum 172, into an exhaust stack 200 (described in greater detail hereinbelow), a distance of from one-quarter to one-half the height of the plenum 172. In use, exhaust air, from which entrained overspray particles have been centrifugally removed in the conical chamber 180, will flow out of the outlet passageway 194 into the exhaust stack 200 whereupon the exhaust air may further be filtered, as described hereinbelow. The outlet passageway 194 has a diameter which is a fraction, such as approximately one-third the diameter of the plenum 172.

A cyclone separator module 170, such as has been described, may be used alone or in conjunction with, air filter cartridges. Such cyclone separators are effective in removing a majority of the oversprayed powder from the spray booth exhaust air. The remaining air, substantially stripped of overspray powder particles, is exhausted to the atmosphere or passed through a module containing a number of filter cartridges to remove any residual fine powder particles remaining entrained in the exhaust air. FIG. 1 shows particles having been collected in the collection hopper 186 as a plurality of black dots.

The exhaust stack 200 includes members 202 and 204 having rectangular cross-section and linear cross-sectional dimensions. However, they may as well be tubular members and described in terms of their being cylindrical, having a diameter.

A first 202 of the two members has an end 206, has an opposite end 208 and has a height as measured between the two ends 206 and 208. The first member 202 is disposed at right angles to the plenum axis 174, and the plenum 172 is adjacent the first (entry) end 206 of the member 202. The plenum 170 is disposed on a one "side" (left, as viewed in the figure) of the first member 202.

The inlet passageway 190 suitably extends through the first member 202, or passes by the exterior of the first member 202. It should be understood that the inlet passageway 190 is not in fluid communication with the first cylindrical 202. Rather, the inlet passageway 190 is in fluid communication with the interior of the spray booth 108, as described hereinbelow.

As mentioned hereinabove, the end of the outlet passageway 194 extends beyond the end 178 of the plenum 172, into the first cylindrical member 202 of the exhaust stack 200, near the end 206 of the first member 202, and is in fluid communication therewith.

All of the plenum 172, inlet passageway 190 and outlet passageway 194 components are disposed in or about an upper portion of the first member 202.

A primary filter stack 210, suitably having the general shape of a cylinder is disposed in a lower portion of the first member 202. The primary filter 210 has a one end 212 which is sealed off, and another opposite end 214 which is in fluid communication with the second member 204. The primary filter stack 210 is suitably one or more (e.g., two) conventional cartridge filters and is vertically-mounted in a side-draft design. Vertical cartridge filter mounting allows free air flow around all sides of the filter cartridges for more efficient use of the total filter area.

The second member 204 has an end 220, has an opposite end 222 and has a height as measured between the two ends 220 and 222. The second member 204 is disposed at right angles to the first member 202, parallel to the plenum axis 174.

The end 220 of the second member 204 is closed off, and abuts the end 208 of the first member 202, and is in fluid communication therewith, as follows. Air which is exhausted by the outlet passageway 194, which may have some residual particulate matter (overspray) entrained therein, flows into the first member 202, then through the filter 210, and then into a first end portion 224 of the second member 204. A baffle plate 226 is disposed at an angle across the first end portion 224 of the second cylindrical member 204. Air exiting the filter 210 is directed at the baffle plate 226, and a portion of any residual particulate matter in the filtered air rebounds off the angled baffle plate 226 and collects in a reservoir portion 228 of the second member 204. This particulate matter is illustrated as a plurality of black dots. Yet, there may still be some residual particulate matter in the airstream.

A secondary (final) filter element 230 is fitted to the opposite end 222 of the second member 204. In use, overspray particles which were not centrifugally separated in the cyclone 170, which passed through the primary filter 210, and which did not rebound off the baffle plate 226 are filtered from the airstream by the final filter 230. The remaining air, devoid of entrained particulate matter, may now be exhausted into the atmosphere (i.e., into the plant).

There have thus been described hereinabove various components for collecting particulate matter (overspray) originating from the conveyor belt 130 and which are entrained in an airstream from the airstream. Air used to contain and recover oversprayed powder is filtered through primary and final filters, and is returned to the plant as clean air. Once collected, the particulate matter (overspray) is preferably reclaimed and recycled into the system for coating the substrate 116 or a subsequent substrate.

The airstream in which the particulate matter is entrained is created in the following manner. A fan wheel 240 is disposed in the interior of the second member 204, at a position approximately midway along its length (height), immediately behind an aperture 241. The fan wheel 240 is on a shaft 242 which is rotated by a suitable mechanism such as an electric motor 244. The electric motor 244 is disposed, such as on stanchions 246, downstream of the fan wheel 240, in a second end portion 248 of the second member 204. The motor 244 may also be disposed external the second member 204 so as to be entirely out of the airstream. The speed (rpm) of the electric motor 244 is readily controlled to optimize operation of the overall overspray collection subsystem 104.

In prior art powder spray systems, it is known to recover particulate matter (overspray) from the trough 140 with a separate, vacuum subsystem (not shown), it being generally thought that since the trough is so wide open that a separate subsystem was necessary to create sufficient sub-ambient air pressure conditions to cause entrainment of the overspray particles. Such a subsystem would include a conduit in fluid communication with the interior of the trough, a vacuum pump, one or more filters, and a collection hopper, and would add substantial complexity and cost to the overall powder spray system.

The Airflow Conduit

In accordance with the invention, an airflow conduit 250 is disposed between the trough 140 and the inlet passageway 190, as follows. A one end 252 of the airflow conduit 250 is in fluid communication with the interior of the trough 140. It is through this end of the airflow conduit 250 that overspray removed from the bottom surface 142 of the belt 130 by the rotating brush 160 will enter the airstream. The arrow 254 represents particulate matter entering (becoming entrained in) the airstream within the airflow conduit 250 and indicates the direction of the airstream in the airflow conduit 250.

An opposite end 256 of the airflow conduit 250 intersects and is in fluid communication with the inlet passageway 190, as follows. An end portion 258 of the inlet passageway 190 is adjacent an upper portion of the spray booth 108. An end 260 of the inlet passageway 190 intersects and is in fluid communication with the interior of the spray booth 108. A point "P" within the inlet passageway 190, which is just downstream (towards the end 192 of the inlet passageway) from the intersection of the airflow conduit 250 and the inlet passageway 190 can be considered to be (i.e., is defined as) the "inlet" of the cyclone separator 170.

In use, with the fan wheel 240 running (rotating), an airflow is created in the inlet passageway 190 in a direction indicated by the arrow 262, from the interior of the spray booth 108, along the inlet passageway 190, out the end 192 of the inlet passageway 190 and into the plenum 172 of the cyclone separator 170. Particulate matter entrained in the airstream is whirled about in the conical chamber 180 of the cyclone 170, as indicated by the arrow 264, and is separated from the airflow by the cyclone 170 and ejected at the small end 182 of the conical chamber 180, as indicated by the arrow 266 into the collection hopper 186. Exhaust air from the conical chamber 180 passes through the outlet passageway 194, as indicated by the arrow 268, into the first member 202, and passes through the primary filter 210 as indicated by the arrow 270. The airstream impacts the baffle plate 226, from whence it continues along the length of the second cylindrical member 204 as indicated by the arrow 272, from whence the airstream passes through the final filter 230 as indicated by the arrow 274. The flow of the airstream is maintained in such a manner that there is no flow from the airflow conduit 250 into the interior of the spray booth 108.

In certain select instances of particle size, substrate size, etc., the airflow generated by the fan wheel 240 may be sufficient to causes entrainment of the particulate matter in the trough 140 into the airstream entering the cyclone separator module 170.

Augmenting Flow In The Airflow Conduit

The airstream in which the particulate matter is entrained is augmented, and entrainment of particulate matter into the airstream is assisted, in the following manner. A compressed air injector 280 is disposed near the trough end 252 of the airflow conduit 250 at a position and in an orientation to deliver a flow of compressed air through the airflow conduit 250, in the direction of, i.e. toward, the inlet point "P" of the cyclone. The flow of compressed air is controlled in such a manner that substantially none of the compressed air from the air injector 280 flows into the trough 140 through the end 252 of the airflow conduit 250. Also, the flow is controlled so that substantially none of the compressed air from the injector 250 flows into the spray booth 180 through the end 260 of the inlet passageway 190. The flow of compressed air from the air injector 280 is indicated by the arrow 282, and its volume is readily controlled. A system controller 284 controls the air pressure supplied from air supply 288 by a regulator 286 to the injector (ejector) nozzle 280, and also controls the speed of the fan 240 (i.e., with the speed of the motor 244). Ideally, regulator 286 and motor 244 are controlled together so that the suction (subambient pressure) in the overspray collection subsystem 104 remains constant. Thus, for example, if the speed of the fan 240 is slowed, the regulator 286 would be opened up to make up for the reduced suction force of the fan.

An important feature of the present invention is that compressed air introduced by the injector 280 into the airflow conduit 250 flows entirely in the direction of the inlet "P" of the cyclone separator 170, and does not "backflow" into the trough 140. In the case of an end portion adjacent the end 252 of the airflow conduit 250 being curved, as illustrated, it is important that the compressed air enter the airflow conduit 250 beyond the curved portion of the airflow conduit 250. In this manner, it can be ensured that the compressed air will expand above (towards the cyclone inlet "P") the curve in the airflow conduit 250.

The overspray collection system 104 of the present invention overcomes various problems associated with the vacuum-based systems of the prior art. Importantly, overspray collected in the trough 140 can be provided to an existing cyclone separator 170 with relatively inexpensive components; namely, an airflow conduit 250, a compressed air injector 280 and an air compressor (not shown). This represents a great savings, and a great decrease in system complexity, when contrasted with a separate vacuum subsystem being employed to collect overspray from the trough 140. The present invention involves fewer moving parts, and is easily adjusted to suit non-uniform system operating conditions.

In use, various parameters are readily adjusted to optimize the setup of the system 100 for each application (production run) of coating different size substrates with different coating materials. As mentioned above, the speed of the motor 244 is readily adjusted (controlled), for example by using a straightforward motor speed control, to establish a desired flow of air within the cyclone separator 170 and pressure draw by the airflow conduit 250 from the trough 140. Also, the precise positioning of the compressed air injector 280 and the air pressure and flow being delivered thereby is readily adjusted. Further, the pressure of the brush 160 against the belt 130 is readily adjusted. Control over these parameters is well within the grasp of one having ordinary skill in the art to which the present invention most nearly pertains, in light of the teachings contained herein.

For example, a cyclone separator may run at a maximum rated capacity of 1800 cubic feet per minute (cfm). However, the speed of the motor 244 and, optionally, the blade design (pitch, camber, number of blades, etc.) of the fan wheel 240 are readily selected to establish a lesser (than 1800 cfm) rate of airflow in the cyclone separator 170. For example, the system may be run to effect a flow of 900 cfm in the cyclone separator.

Regarding establishing an airtight seal between the trough 140 and the bottom surface 142 of the belt 130, it has been determined that this is not necessary. As a "rule of thumb", a flow of air on the order of 100 feet/min through any opening is adequate for containment purposes. The aforementioned seals 150 and 152 are optional, and may or not be employed in a given application. Negative (subambient) pressure at the trough end 252 of the airflow conduit 250 is established by the velocity pressure of the cyclone separator 170, and the flow of air with entrained overspray particles within the airflow conduit 250 is augmented by compressed air directed by the compressed air injector 280. In a typical application of the system, compressed air at a pressure of 80–100 psi has been found to be adequate to ensure a reliable flow of air with entrained overspray particles through the airflow conduit 250 into the cyclone inlet "P". Pressures of 30–40 psi have been found to be adequate in certain applications.

Calculations can certainly be made to estimate how much cyclone pressure loss can be expected as a result of adding the airflow conduit 250 to the system, and this can be used as a "starting point" for the selection of airflow to be provided by the compressed air injector 280. Nevertheless, to a large extent, for a given application (substrate size, powder type) these parameters are best optimized empirically, based on settings which have been determined to be optimal for previous, similar applications.

It is apparent that there has been provided in accordance with this invention apparatus and methods for reclaiming overspray in a spray coating system that is both efficient and economical, and that is readily adapted to a variety of applications and non-uniform operating conditions. An overspray collection subsystem incorporates a brush for dislodging the oversprayed particles from a conveyor moving a workpiece through a spray booth and an air injector for creating a subambient airflow to entrain the oversprayed particles dislodged from the brush into an airstream flowing through a passageway into the collection subsystem.

While the invention has been described in combination with embodiments thereof, it is evident that many alternatives, modifications, and variations will be apparent to those skilled in the art in light of the foregoing description. Accordingly, the invention is intended to embrace all such alternatives, modifications and variations as fall within the spirit and broad scope of the appended claims.

What is claimed is:

1. A method of reclaiming overspray powder particles which do not adhere to the articles being sprayed in a powder coating system, the method comprising the steps of:

creating an airstream within a collection system for entraining a first portion of said overspray powder and transferring the entrained oversprayed powder particles from a spray booth through an inlet passageway to the collection system;

injecting compressed fluid into a conduit for entraining a second portion of said overspray powder and transferring the entrained overspray powder particles from the spray booth to the inlet passageway; and separating oversprayed powder particles from the airstream.

2. The method of claim 1 further comprising the steps of:

dislodging oversprayed powder particles from a surface of a conveyor with a brush into a trough disposed below the spray booth; and entraining oversprayed powder particles collected in the trough into the conduit and then through the inlet passageway to be acted upon by the collection system.

3. The method of claim 2 further comprising the step of injecting the compressed air at a position in the airflow and in a direction to ensure that there is no backflow into the trough.

4. The method of claim 1 further comprising the steps of:

creating the airstream with a fan driven by a motor disposed in the collection system; and controlling the pressure of the compressed injector air and the speed of the fan motor with a system controller.

5. In a powder coating system having a spray booth for the application of powder coating materials to articles, a system for reclaiming overspray particles which do not adhere to the articles comprising:

a collection system for creating an airstream for entraining overspray particles and for separating the entrained overspray particles from the airstream, said collection system having an inlet passageway in fluid communication with an interior of the spray booth;

a conduit extending between the inlet passageway and the spray booth for the transfer of entrained overspray particles from the spray booth to the collection system; and an injector for injecting compressed gas into the conduit in a direction towards the inlet passageway.

6. The system of claim 5 further comprising:

a conveyor disposed at a bottom of the spray booth and above a trough, the trough having a rotating brush for dislodging overspray particles from a surface of the conveyor into the trough; and the airflow conduit extending between the trough and the inlet passageway so that overspray particles collected in the trough become entrained in the airstream and are acted upon by the collection system.

7. The system of claim 5 wherein the collection system includes a cyclone separator receiving the airstream with entrained particles for separating the entrained overspray particles from the airstream.

8. The system of claim 7 further comprising an exhaust stack in fluid communication with an outlet of the cyclone separator and receiving the airstream therefrom.

9. The system of claim 8 wherein the exhaust stack further comprises a filter in fluid communication with the outlet of the cyclone separator.

10. The system of claim 9 wherein the exhaust stack further comprises a final exhaust filter receiving the airstream passing through the filter and separating entrained overspray particles therefrom.

11. The system of claim 5 further comprising a fan for drawing the airstream entrained with overspray particles from the powder booth and into the collection system, the fan being driven by a motor, and still further comprising an injector control for controlling the pressure of the compressed injector air and a fan motor control for controlling the speed of the fan motor.

12. The system of claim 11 wherein the injector control and the fan control are controlled by a system controller.

13. A powder coating system for powder coating substrates, comprising:

a spray system including a spray booth disposed above a conveyor system for conveying the substrates through the spray booth;

a trough having a rotating brush disposed below the conveyor for dislodging overspray particles from a surface of the conveyor into the trough;

a collection system for creating an airstream for entraining overspray particles and for separating the entrained overspray particles from the airstream, said collection system having an inlet passageway in fluid communication with an interior of the spray booth;

an airflow conduit extending between the trough and the inlet passageway; and an injector for injecting compressed air into the airflow conduit in a direction toward the inlet passageway.

14. The powder spray system of claim 13 wherein the conveyor system further includes a conveyor belt for supporting the substrate within the spray booth and for conveying the substrate from without the spray booth to within the spray booth.

15. The powder spray system of claim 14 wherein the collection system includes a cyclone separator receiving the airstream with entrained overspray particles for separating the entrained overspray particles from the airstream.

16. The powder spray system of claim 15 further comprising an exhaust stack in fluid communication with an outlet of the cyclone separator and receiving the airstream therefrom.

17. The system of claim 16 wherein the exhaust stack further comprises a primary filter stack in fluid communication with the outlet of the cyclone separator.

18. The powder spray system of claim 16 further comprising a rotating fan wheel within the exhaust stack.

19. The powder spray system of claim 18 further comprising control means for balancing the pressure of the compressed injector air with the speed of the fan wheel to keep the airstream from the powder booth into the collection system substantially constant.

20. In a powder coating system having a spray booth for the application of powder coating materials to articles, a system for reclaiming overspray particles which do not adhere to the articles comprising:

a collection system for creating an airstream for entraining overspray particles and for separating the entrained overspray particles from the airstream, said collection system having an inlet passageway in fluid communication with a first interior portion of the spray booth;

a conduit in fluid communication with the inlet passageway and a second portion of the spray booth for the transfer of entrained overspray particles from the spray booth to the collection system; and an injector for injecting compressed fluid into the conduit.

21. The system of claim 20 wherein said second portion of said spray booth further comprises a trough for collecting overspray particles, and said conduit is in fluid communication with said trough and said inlet passageway.

22. The system of claim 21 wherein said trough further comprises a brush.

23. The system of claim 21 wherein said trough is disposed below said first portion of said spray booth.

24. The system of claim 20 wherein said injector is located within said conduit.

* * * * *

UNITED STATES PATENT AND TRADEMARK OFFICE
CERTIFICATE OF CORRECTION

PATENT NO. : 5,906,676
DATED : May 25, 1999
INVENTOR(S) : Colin K. Drummond

It is certified that error appears in the above-identified patent and that said Letters Patent is hereby corrected as shown below:

Column 1, Line 24, please delete the second instance of "to increase".

Column 1, Line 60, please delete "of" before the word "vertical-feed" and insert -- or the --.

Column 6, Line 55, please insert -- member -- before "202".

Column 7, Line 42, please insert -- and then recovered -- after "in an airstream".

Column 9, Line 1, please delete "250" and insert -- 280 --.

Signed and Sealed this

Twenty-third Day of November, 1999

Attest:

Q. TODD DICKINSON

*Attesting Officer*      *Acting Commissioner of Patents and Trademarks*